United States Patent [19]
Katayama et al.

[11] 3,964,321
[45] June 22, 1976

[54] FIXING DEVICE FOR SPEED METER DRIVEN GEAR

[75] Inventors: Nobuaki Katayama, Toyota; Isao Tsuzuki, Kariya; Mikio Kaneko, Toyota, all of Japan

[73] Assignee: Toyota Jidosha Kogyo Kabushiki Kaisha, Toyota, Japan

[22] Filed: Aug. 7, 1974

[21] Appl. No.: 495,420

[30] Foreign Application Priority Data
June 6, 1974 Japan.............................. 49-64302

[52] U.S. Cl. .................................................. 74/12
[51] Int. Cl.² ...................................... F16H 37/00
[58] Field of Search ................................... 74/12

[56] References Cited
UNITED STATES PATENTS

| | | | |
|---|---|---|---|
| 1,712,955 | 5/1929 | Gustafson | 74/12 |
| 1,726,421 | 8/1929 | Berge | 74/12 |
| 2,793,532 | 5/1957 | Johnson et al. | 74/12 |

Primary Examiner—Benjamin W. Wyche
Assistant Examiner—Wesley S. Ratliff, Jr.
Attorney, Agent, or Firm—Lane, Aitken, Dunner & Ziems

[57] ABSTRACT

There is disclosed a fixing device for a speed meter driven gear which comprises a sleeve attached to a transmission casing or an extension housing thereof in an automobile, a rotary shaft rotatably disposed within the sleeve, and a speed meter driven gear fixedly mounted on part of the rotary shaft in a manner to be maintained in meshing relation to a speed meter drive gear of an output shaft. A resilient clip is secured to the aforesaid rotary shaft and sleeve, so as to restrain the axial directional movement of the rotary shaft within the sleeve.

A slit is provided in the aforesaid sleeve, and an annular groove is provided in the aforesaid rotary shaft in a manner to correspond with the slit, so that a locking portion of the aforesaid resilient clip may be locked in the slit and annular groove, and a retaining portion thereof is resiliently retained by the aforesaid sleeve.

5 Claims, 3 Drawing Figures

FIXING DEVICE FOR SPEED METER DRIVEN GEAR

BACKGROUND OF THE INVENTION

This invention relates to a fixing device for a speed meter driven gear for use in an automobile.

A speed meter driven gear, in general, is mounted in an extension housing of a transmission casing so as to actuate a speed meter for indication as well as drive an odd meter. Hitherto, the fixing of the driven gear in its axial direction has been effected in the end face of extension housing by using a thrust bearing. To this end, the extension housing of the general type need be partly modified for forming an end face for use in a thrust bearing. This, however, is attended with the drawbacks that the housing becomes complicated in construction as well as suffers from the uneven strength, for example, the strong or weak portion appears in the housing, resulting in the lowering in the rigidity thereof. With an intension to avoiding the lowering in the rigidity, to form an end face for use in a thrust bearing is accompained by another drawback that a compact and light weight housing is difficult to be obtained. Particularly, in case the housing is molded by a die casting process, an excessive wall thickness results. This leads to increase in a manufacturing cost as well as increase in weight. Furthermore, the attaching position is restricted to a greater extent depending upon a parting line of a mold. A further attempt has been made, in which a pin is provided between the rotary shaft having one end, on which is fixed a speed meter driven gear, and the sleeve fixed to the extension housing, so that the rotary shaft may not be slipped off from the sleeve. Such a construction is inferior from the viewpoint of assembling and disassembling. In addition, machining for providing a bore for the sleeve need resort to eccentric cutting, and so, an attention more than required should be paid so as not to damage a drill used.

SUMMARY OF THE INVENTION

According to the present invention, there is provided a fixing device for a speed meter driven gear, which comprises a sleeve attached to an extension housing of a transmission casing in an automobile; a rotary shaft rotatably mounted in the aforesaid sleeve, and a speed meter driven gear rigidly mounted on part of the aforesaid rotary shaft, in a manner to be maintained in meshing relation to a speed meter drive shaft of an output shaft. A resilient clip is secured to the rotary shaft and the sleeve, so that the rotary shaft may be prevented from moving in the axial direction thereof within the sleeve. Thus, the rotary shaft permits to only rotate within the sleeve due to rotation of the speed meter drive gear meshing therewith. The resilient clip functions to prevent the slipping-off of the rotary shaft from the sleeve. It is preferable that a sector-shaped slit be provided in the sleeve to such a depth that pierces the wall of sleeve to extend to the inner wall thereof, and an annular groove be provided in the rotary shaft in a manner to correspond to the slit, so that the aforesaid resilient clip may be locked to the slit and annular groove. The resilient clip, for example, consists of a retaining portion and a locking portion, the locking portion being fitted in the slit and groove so as to restrain the axial movement of the rotary shaft, and the retaining portion being resiliently retained on the outer periphery of the sleeve. The sleeve should preferably consist of a large diametric portion and a small diametric portion, between which is formed a shoulder, the large diametric portion being fixed to the extension housing, with an O-ring being interposed therebetween, while the small diametric portion receiving therein the rotary shaft in a close contacting condition. To improve lubrication between the rotary shaft and the small diametric portion, a spiral shaped or the like-shaped oil groove is formed around the outer periphery of rotary shaft in a manner to lead to the end face of the aforesaid sleeve, and a gap is provided between the aforesaid speed meter driven gear and the end face of sleeve. Thus, oil within the extension housing will flow along the aforesaid oil groove to ingress between the rotary shaft and the sleeve, thereby providing improved lubrication therebetween. The oil which has effected lubrication is returned, by way of an oil return hole provided in part of the sleeve, to the extension housing. A sealing material is disposed between the rotary shaft and the sleeve in a portion slightly outwards in the axial direction of tne sleeve with respect to the oil return hole, thereby preventing leakage of oil. If the rotary shaft is provided in inclined condition, flow of oil along the oil groove will be smoothed.

It is an object of the present invention to provide a fixing device for a speed meter driven gear, wherein an extension housing is simple in configuration and improved in rigidity.

Another object of the present invention is to provide a fixing device for a speed meter driven gear, wherein an extension housing is free from an undesired, excessive wall thickness in inner construction and reduced in the over-all weight to a greater extent.

A further object of the present invention is to provide a fixing device for a speed meter driven gear, which is improved in the assembling as well as in disassembling.

A still further object of the present invention is to provide a fixing device for a speed meter driven gear, which is easy in machining and unexpensive in a manufacturing cost.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in conjunction with the accompanying drawings wherein.

DETAILED DESCRIPTION OF THE INVENTION

Figure 1:
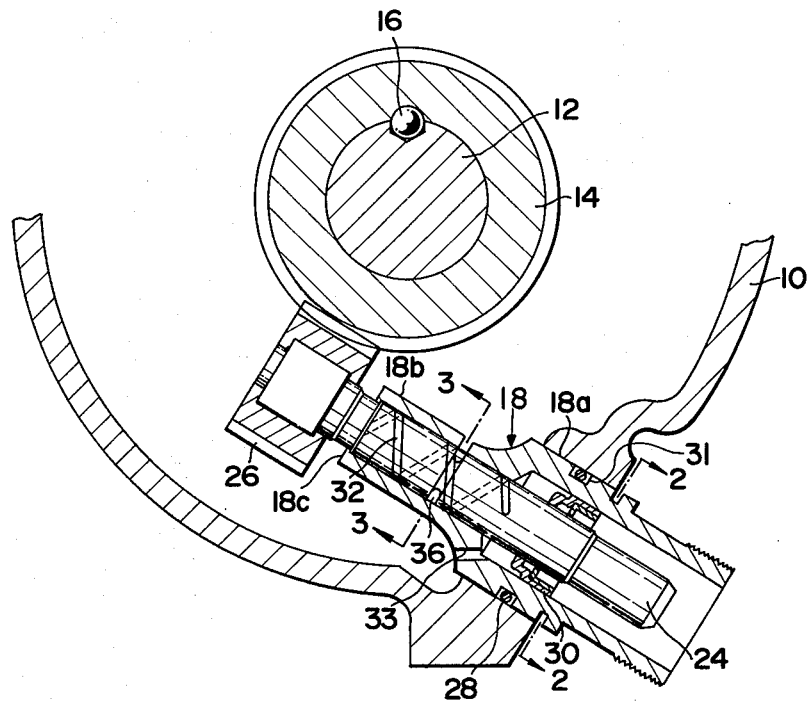
FIG. 1 is a cross-sectional view of a fixing device for a speed meter driven gear according to the present invention.
Figure 2:
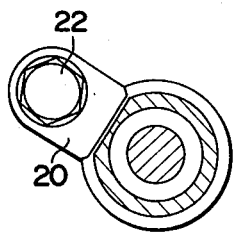
FIG. 2 is a cross-sectional view taken along the line 2—2 of FIG. 1.
Figure 3:
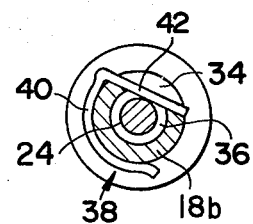
FIG. 3 is a cross-sectional view taken along the line 3—3 of FIG. 1.

FIGS. 1 through 3 depict a preferred one of the many possible implementations of the principles of this invention. In the embodiment illustrated, shown at 10 is an extension housing of a transmission casing. Disposed within the housing 10 is an output shaft 12, to which a speed meter drive gear 14 is fixed by way of a ball 16 in the rotating direction thereof and by way of a snap ring in the axial direction thereof. A sleeve 18 is inserted in part of the housing 10. The sleeve 18 is fixed to the housing 10 by fastening a lock plate 20 to the housing 10 by means of a bolt 22, as shown in FIG. 2. A rotary shaft 24 is rotatably disposed in a bore of the sleeve 18. Rigidly mounted on one end of the rotary shaft 24 is a speed meter driven gear 26, which is in meshing relation to the drive gear 14. How to fix the driven gear 26 to the rotary shaft 24 is optional. The other end of rotary shaft 24 is attached with a member to be connected to the speed meter, which member is not shown because it is quite the same as the conventional one.

The sleeve 18 should recommendably be composed of a large diametric portion 18a and a small diametric portion 18b. An annular groove 31 is provided around the outer periphery of large diametric portion 18a, in which groove 31 is fitted an O-ring 28, thereby providing liquid-tightness between the large diametric portion 18a and the wall of the bore of housing 10. A sealing material 30 is fitted between the inner wall of large diametric portion 18a and the outer periphery of rotary shaft 24, thereby providing seal therebetween. The small diametric portion 18b of sleeve 18 receives therein the rotary shaft 24 in a manner to permit its rotation. The small diametric portion 18b is of any length in the longitudinal direction, so far as same can support the rotary shaft 24 in a manner to permit the smooth rotation thereof.

A spiral oil groove 32 is provided around the outer periphery of rotary shaft 24 in a portion corresponding to the small diametric portion 18b of sleeve 18. The oil groove 32 contributes to providing smooth lubrication between the rotary shaft 24 and the sleeve 18. Although only a single oil groove 32 is provided in the embodiment shown, there may be provided plural grooves. If the rotary shaft 24 is disposed aslant as shown in the drawing, smooth lubrication will result. For facilitating ingress of lubricating oil between the rotary shaft 24 and the sleeve 18, it is preferable that a gap be provided between the driven gear 26 and the end face 18c of sleeve 18, and part of oil groove 32 is open to the end face 18c of sleeve 18. The lubricating oil which has effected lubrication is returned by way of an oil return hole 33 to the inside of housing 10.

A sector-shaped slit 34 is provided midway of the small diametric portion 18b of sleeve 18. An annular groove 36 is provided around the outer periphery of rotary shaft 24 in a manner to correspond with the aforesaid sector-shaped slit 34. Shown at 38 is a resilient clip which is secured to the slit 34 and annular groove 36 so as to restrain the axial movement of the rotary shaft 24. The resilient clip 38 should preferably consist of a retaining portion 40 having a curvature slightly larger than that of the small diametric portion 18b of sleeve 18, and a locking portion 42 extending from the retaining portion 40 substantially at right angles thereto. The locking portion 42 should preferably be formed in a linear shape so as to be spaced from the annular groove 36 and contact the bottoms of slit 34. The annular groove 36 has a depth substantially equal to a diameter of the resilient clip 38.

To attach the resilient clip 38 to the rotary shaft 24 and the sleeve 18, the retaining portion 40 and the locking portion 42 are brought into expansion so as to fit the locking portion 42 in the slit 34, whereby the resilient clip is set in place with ease in a condition as shown in FIG. 3.

The invention is not limited to the particular details of construction of the embodiments depicted, and it is contemplated that various and other modifications and applications will occur to those skilled in the art. Therefore, because certain changes may be made in the above-described device without departing from the true spirit and scope of the invention herein involved, it is intended that the subject matter of the above depiction shall be interpreted as illustrative and not in a limiting sense.

What is claimed is:

1. An assembly for connecting to a vehicle housing for driving a speedometer, said assembly comprising a sleeve secured to said vehicle housing and having a slit extending therethrough, a drive gear adapted for operative engagement with an output shaft of said vehicle and disposed in a spaced relation to one end portion of said sleeve to define a gap, a drive shaft secured to said drive gear for rotation therewith, said shaft extending from said gear, across said gap and into said sleeve for support by said sleeve, a spiral oil groove formed on the outer surface of said shaft and communicating with said gap to permit lubrication between said shaft and said sleeve, an annular groove provided on said shaft in alignment with said slit, and a resilient clip having an arcuate retaining portion extending around said sleeve and a straight locking portion extending from said retaining portion and into said annular groove and said slit to restrain axial movement of said shaft relative to said sleeve.

2. The assembly as defined in claim 1 wherein said sleeve consists of a large diametric portion and a small diametric portion, between which is formed a shoulder, said large diametric portion being securely attached to said housing with an O-ring being interposed therebetween, and said small diametric portion receiving said shaft.

3. The assembly as defined in claim 1 wherein said oil groove extends in a spiral manner along said shaft with one end of said oil groove being located at said end portion of said sleeve and the other end of said oil groove being located at a point intermediate the ends of said sleeve, and wherein an oil return hole extends through said sleeve in communication with said other end of said oil groove.

4. A fixing device as defined in claim 3 further comprising sealing means disposed between said shaft and said sleeve and located between the other end portion of said sleeve and said other end of said oil groove to prevent leakage of oil.

5. A fixing device as defined in claim 1 wherein said shaft is disposed at an angle with respect to said housing to facilitate the flow of oil along said oil groove.

* * * * *